United States Patent
Bowman et al.

(10) Patent No.: US 9,858,078 B2
(45) Date of Patent: Jan. 2, 2018

(54) SPECULATIVE LOAD DATA IN BYTE-WRITE CAPABLE REGISTER FILE AND HISTORY BUFFER FOR A MULTI-SLICE MICROPROCESSOR

(71) Applicant: International Business Machines Corporation, Armonk, NY (US)

(72) Inventors: Joshua W. Bowman, Austin, TX (US); Sundeep Chadha, Austin, TX (US); Michael J. Genden, Austin, TX (US); Dhivya Jeganathan, Austin, TX (US); Dung Q. Nguyen, Austin, TX (US); David R. Terry, Austin, TX (US); Eula F. Tolentino, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/728,534

(22) Filed: Jun. 2, 2015

(65) Prior Publication Data
US 2016/0357566 A1    Dec. 8, 2016

(51) Int. Cl.
*G06F 9/30* (2006.01)
*G06F 9/38* (2006.01)

(52) U.S. Cl.
CPC ........ *G06F 9/3836* (2013.01); *G06F 9/30043* (2013.01); *G06F 9/3824* (2013.01); *G06F 9/3838* (2013.01); *G06F 9/3842* (2013.01)

(58) Field of Classification Search
CPC .. G06F 9/3836; G06F 9/30043; G06F 9/3824; G06F 9/3838
See application file for complete search history.

(56) References Cited

U.S. PATENT DOCUMENTS

| | | |
|---|---|---|
| 5,751,981 A | 5/1998 | Witt et al. |
| 7,099,913 B1 | 8/2006 | Bertone et al. |
| 7,689,812 B2 | 3/2010 | Abernathy et al. |
| 9,058,180 B2 | 6/2015 | Golla et al. |
| 9,135,005 B2 | 9/2015 | Alexander et al. |
| 2008/0288819 A1 | 11/2008 | Heller, Jr. |

(Continued)

OTHER PUBLICATIONS

Bowman et al., "Speculative Load Data in Byte-Write Capable Register File and History Buffer for a Multi-Slice Microprocessor," U.S. Appl. No. 14/827,284, filed Aug. 15, 2015, 33 pages.

(Continued)

*Primary Examiner* — Benjamin Geib
(74) *Attorney, Agent, or Firm* — VanLeeuwen & VanLeeuwen; Steven L. Bennett

(57) ABSTRACT

An approach is provided is provided in which a computing system matches a writeback instruction tag (ITAG) to an entry instruction tag (ITAG) included in an issue queue entry. The writeback ITAG is provided by a first of multiple load store units. The issue queue entry includes multiple ready bits, each of which corresponds to one of the multiple load store units. In response to matching the writeback ITAG to the entry ITAG, the computer system sets a first ready bit corresponding to the first load store unit. In turn, the computing system issues an instruction corresponding to the entry ITAG based upon detecting that each of the multiple ready bits is set.

13 Claims, 9 Drawing Sheets

(56) References Cited

U.S. PATENT DOCUMENTS

2013/0339679 A1* 12/2013 Iyer ...................... G06F 9/3851
  712/225

OTHER PUBLICATIONS

"List of IBM Patents or Patent Applications Treated as Related," Letter from Leslie A. Van Leeuwen, Aug. 15, 2015, 1 page.
IBM, "Early Write Back to Register File in Load Look Ahead Mode," an IP.com Prior Art Database Technical Disclosure, IP.com No. 000135640, Apr. 20, 2006, 2 pages.
IBM, "Method and apparatus for synchronization between out of order dispatched instruction stream and execution queue," an IP.com Prior Art Database Technical Disclosure, IP.com No. 000126022, Jun. 28, 2005, 10 pages.

* cited by examiner

| Ready Bits 500 | | | |
|---|---|---|---|
| LSU 0 | LSU 1 | LSU 2 | LSU 3 |
| TARGET:<br>Asserted when LSU 0 writes data to register.<br><br>NON-TARGET:<br>Pre-Asserted | TARGET:<br>Asserted when LSU 1 writes data to register.<br><br>NON-TARGET:<br>Pre-Asserted | TARGET:<br>Asserted when LSU 2 writes data to register.<br><br>NON-TARGET:<br>Pre-Asserted | TARGET:<br>Asserted when LSU 3 writes data to register.<br><br>NON-TARGET:<br>Pre-Asserted |
| 510 | 520 | 530 | 540 |

SPECULATIVE LOAD DATA IN BYTE-WRITE CAPABLE REGISTER FILE AND HISTORY BUFFER FOR A MULTI-SLICE MICROPROCESSOR

BACKGROUND

The present disclosure relates to managing speculative load data in byte-write capable register file and history buffer utilized in a multi-slice microprocessor.

In traditional processors, load data is written into a general purpose register (GPR) when an address translation of a corresponding instruction is known. As such, data is typically not written into the general purpose register until the load instruction passes translation and the data is in a cache. However, in order to improve performance, load data may be returned and written into a general purpose register or history buffer before the address translation is known.

Traditional processor architectures typically structure an issue queue, register, and history buffer in a one-to-one configuration that receives writeback data in its entirety from a load store unit. As such, the issue queue, register, and/or history buffer store the writeback data in their corresponding entries that include instruction tag (ITAG) values matching the writeback data's ITAG values. However, processors with distributed architectures may configure issue queues, registers, history buffers, and load store units in a distributed manner instead of the one-to-one configuration as in traditional processor designs. As such, processors with a distributed architecture may have multiple load store units able to provide portions of the writeback data to the issue queue, register, and/or history buffer.

BRIEF SUMMARY

According to one embodiment of the present disclosure, an approach is provided in which a computing system matches a writeback instruction tag (ITAG) to an entry instruction tag (ITAG) included in an issue queue entry. The writeback ITAG is provided by a first of multiple load store units. The issue queue entry includes multiple ready bits, each of which corresponds to one of the multiple load store units. In response to matching the writeback ITAG to the entry ITAG, the computer system sets a first ready bit corresponding to the first load store unit. In turn, the computing system issues an instruction corresponding to the entry ITAG based upon detecting that each of the multiple ready bits is set.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting a group of ready bits that are stored and tracked by the registers, issue queues, and history buffers for each entry;

DETAILED DESCRIPTION

Figure 1:
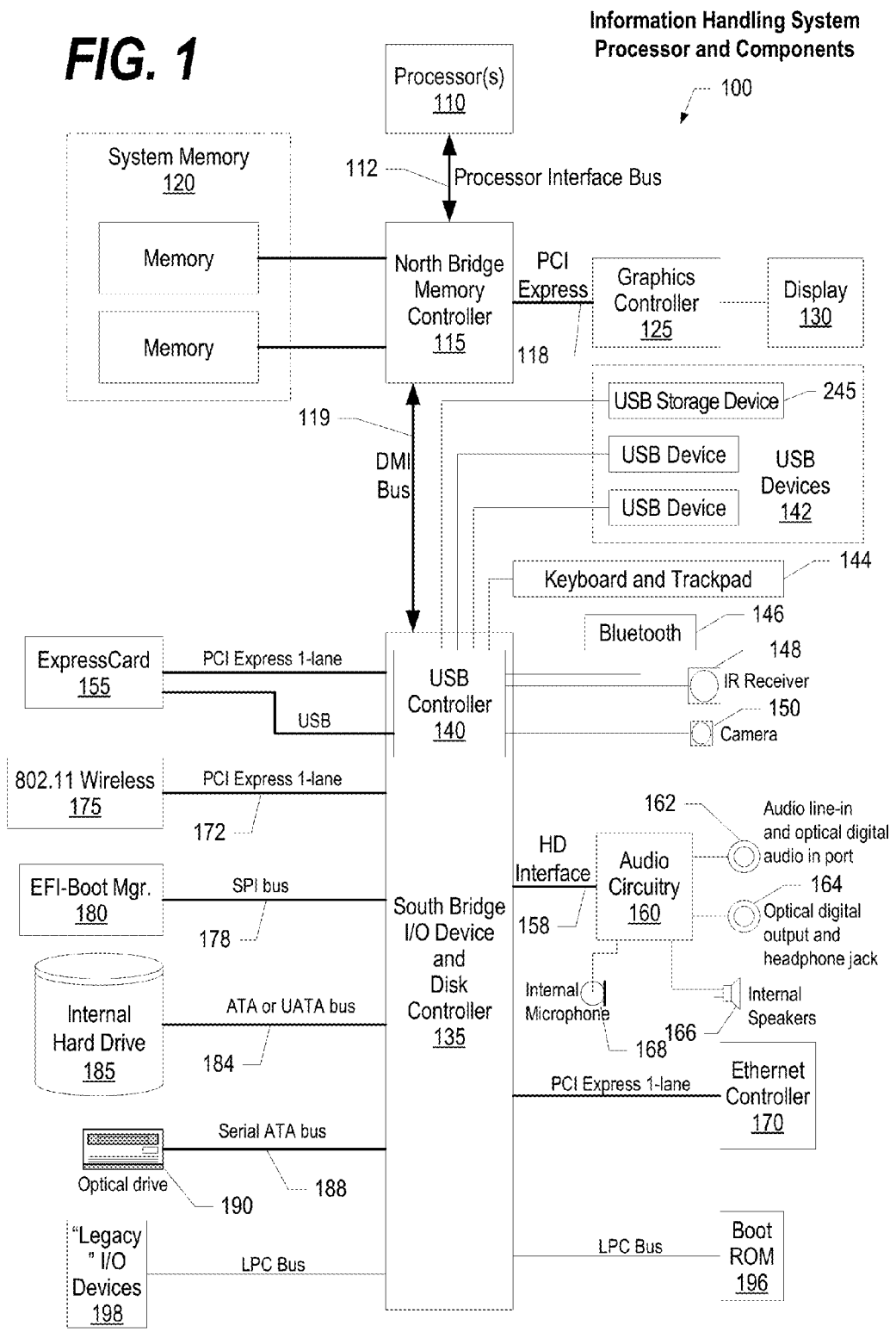
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
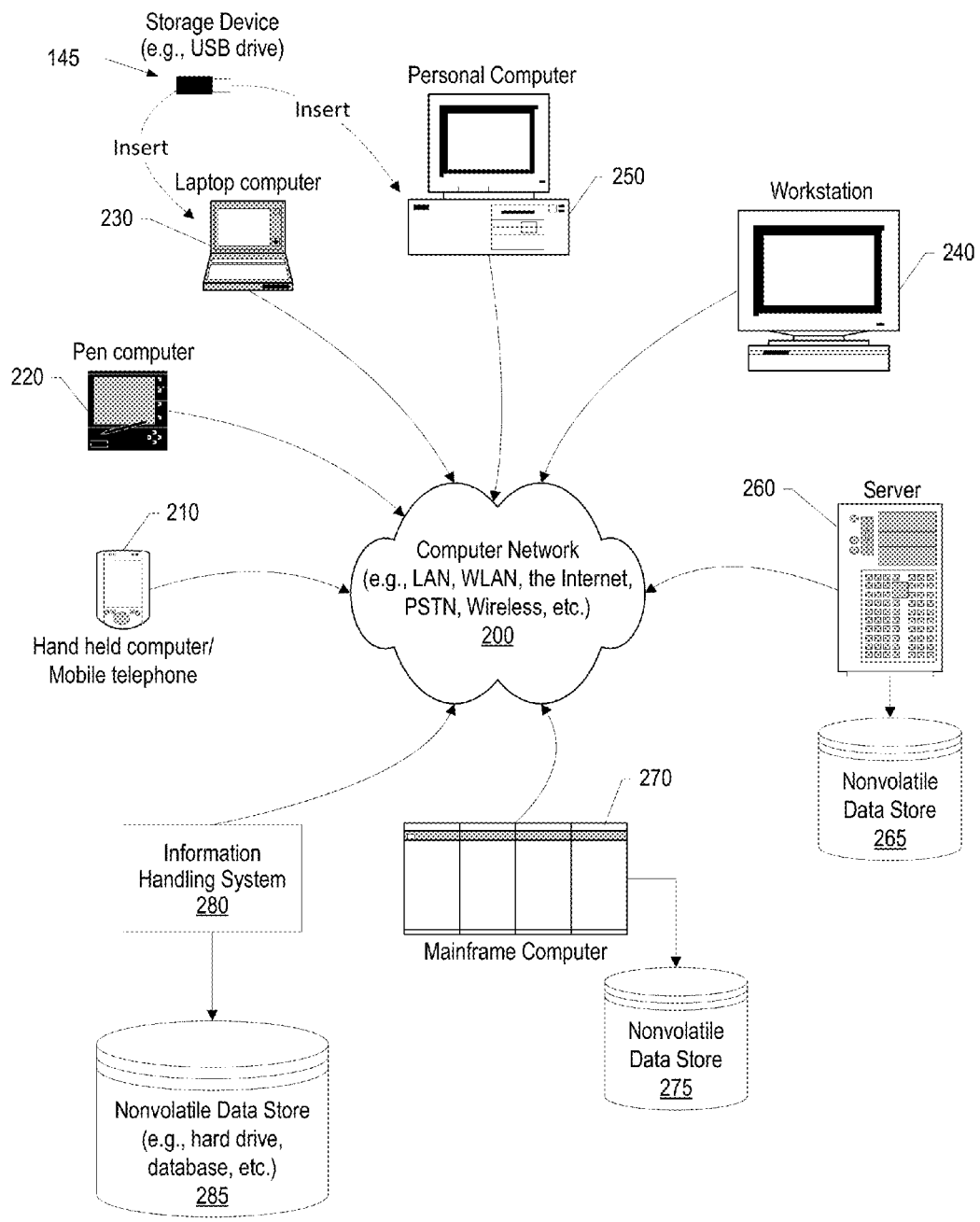
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
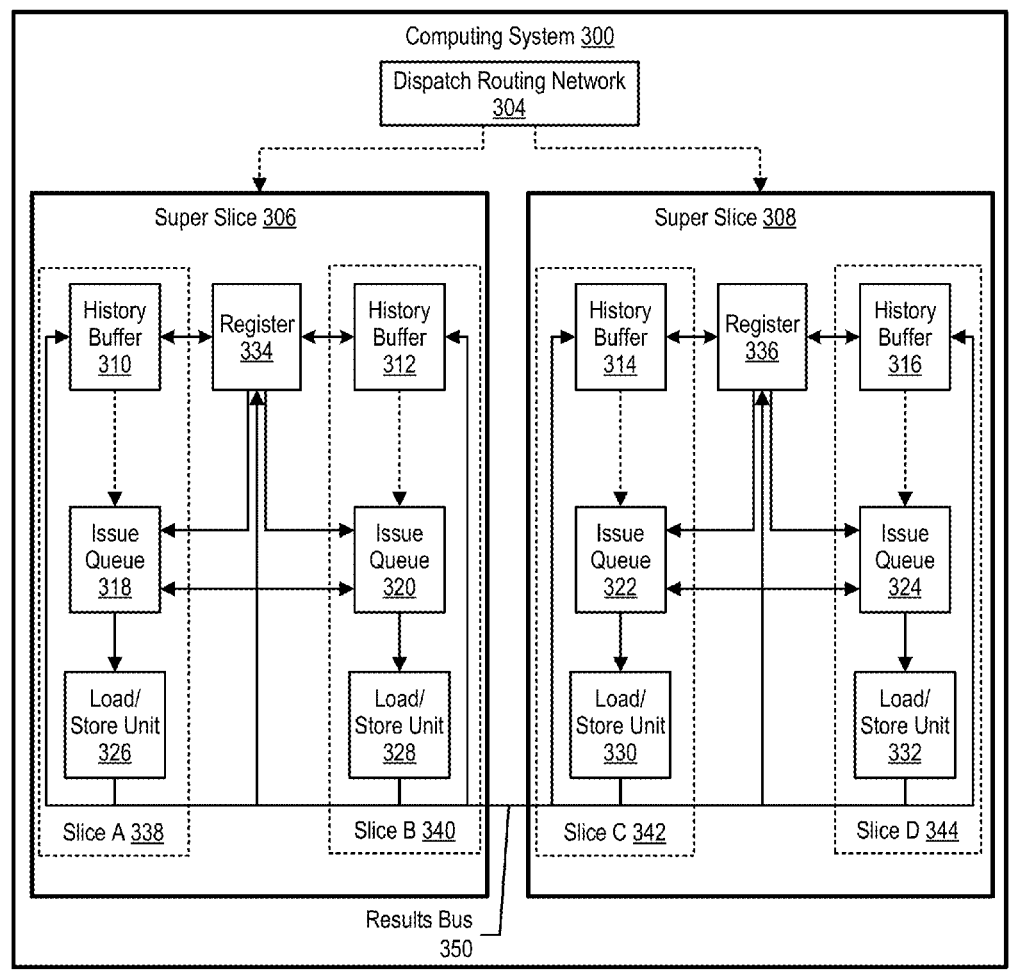
FIG. 3 is an exemplary diagram depicting a computing system that performs speculative load data in byte-write capable register file and history.

FIG. 3 is an exemplary diagram depicting a computing system that performs speculative load data in byte-write capable register file and history. Computing system 300, such as a processor or multi-processor, includes a distributed, multi-slice architecture.

Computing system 300 includes two super slices 306 and 308, which includes two slices and a register. Super slice 306 includes register 334, slice A 338 and slice B 340. Each of the slices 338 and 340 include a history buffer (310, 312), issue queue (318, 320), and load store unit (266, 328). Likewise, super slice 308 includes register 336, slice C 342 and slice D 344. Each of the slices 342 and 344 include a history buffer (314, 316), issue queue (322, 324), and load store unit (330, 332). In one embodiment, each slice may also include other types of execution units, such as a vector scalar unit (VSU), to process instructions.

Results bus 350 allows each of the load store units to provide writeback data, or portions thereof, to each of the registers, history buffers, and issue queues across different slices and different super slices. As such, each of the entries in the registers, history buffers, and issue queues include "ready bits" that indicate when particular load store units provide portions of the writeback data for which they are responsible. In turn, an instruction is ready to issue when each of the ready bits are set.

FIG. 5 shows one embodiment of ready bits 500, which includes a bit corresponding to each load store unit shown in FIG. 3. In another embodiment, during a VSU writeback, the VSU may return a full 64 (or 128) bits of aligned data in one single write. As such, each of ready bits 500 are set during the VSU writeback to indicate that the instruction is ready for issue.

Each register, history buffer, and issue queue track ready bits for instructions for which they are responsible. When dispatch routing network 304 dispatches a new instruction and targets a register, the targeted register looks up the current ITAG/ready bits/data/etc. at the targeted register entry. The register sends the current target information to a selected history buffer, which includes the data and ready bits. The register then overwrites the old register data with the new instruction target information and clears the existing ready bits (e.g., "0").

When a register is read as a source to a new instruction, the register's ready bits are read for the source register and migrated to the corresponding issue queue. In one embodiment, the register passes a producer bit to the issue queue, which indicates whether the writeback data for that source will be provided by a vector scalar unit or load store units. For example, the producer bit may be 1 if the writeback data will be provided by the vector scalar unit, and will be a 0 if the writeback data will be provided by one or more load store units. When the same register is targeted a second time by a new dispatched instruction, the register's ready bits are read and migrated to a corresponding history buffer along with other register information.

Figure 7:
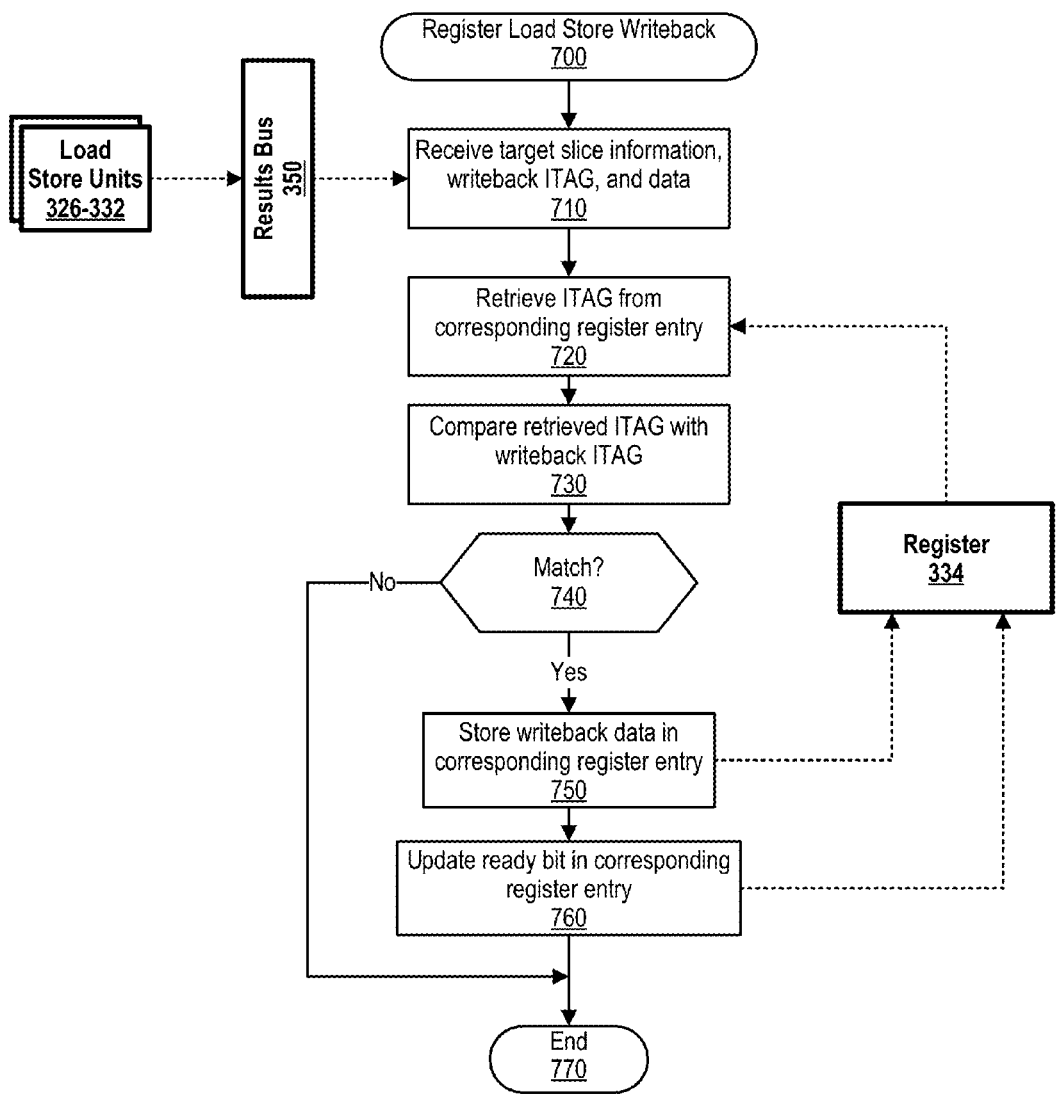
FIG. 7 is an exemplary flowchart depicting steps taken by a computing system to receive writeback data from load/store units at a register and update ready bits accordingly.
Figure 8:
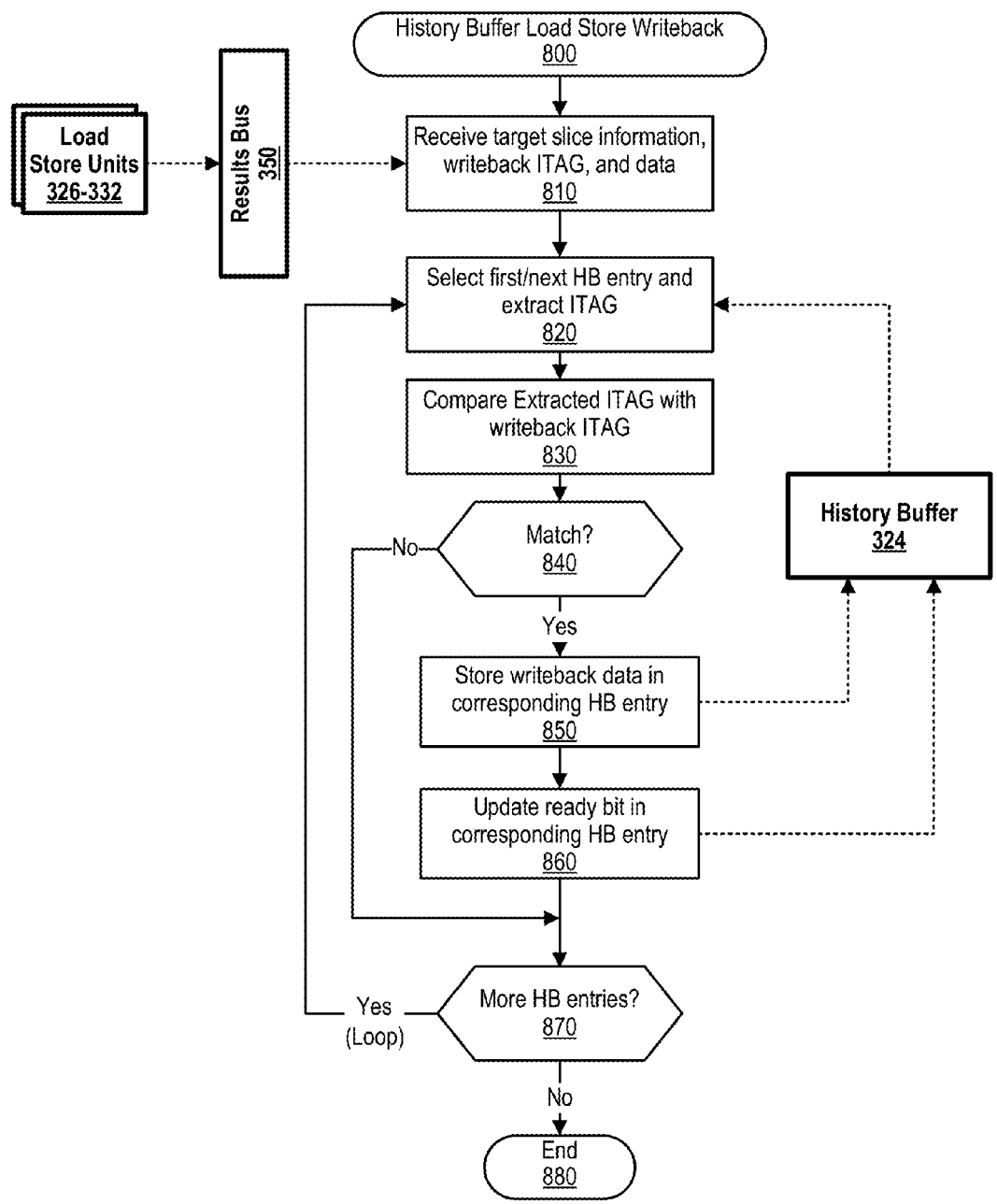
FIG. 8 is an exemplary flowchart depicting steps taken by a computing system to receive writeback data from load store units at a history buffer and update ready bits accordingly.
Figure 9:
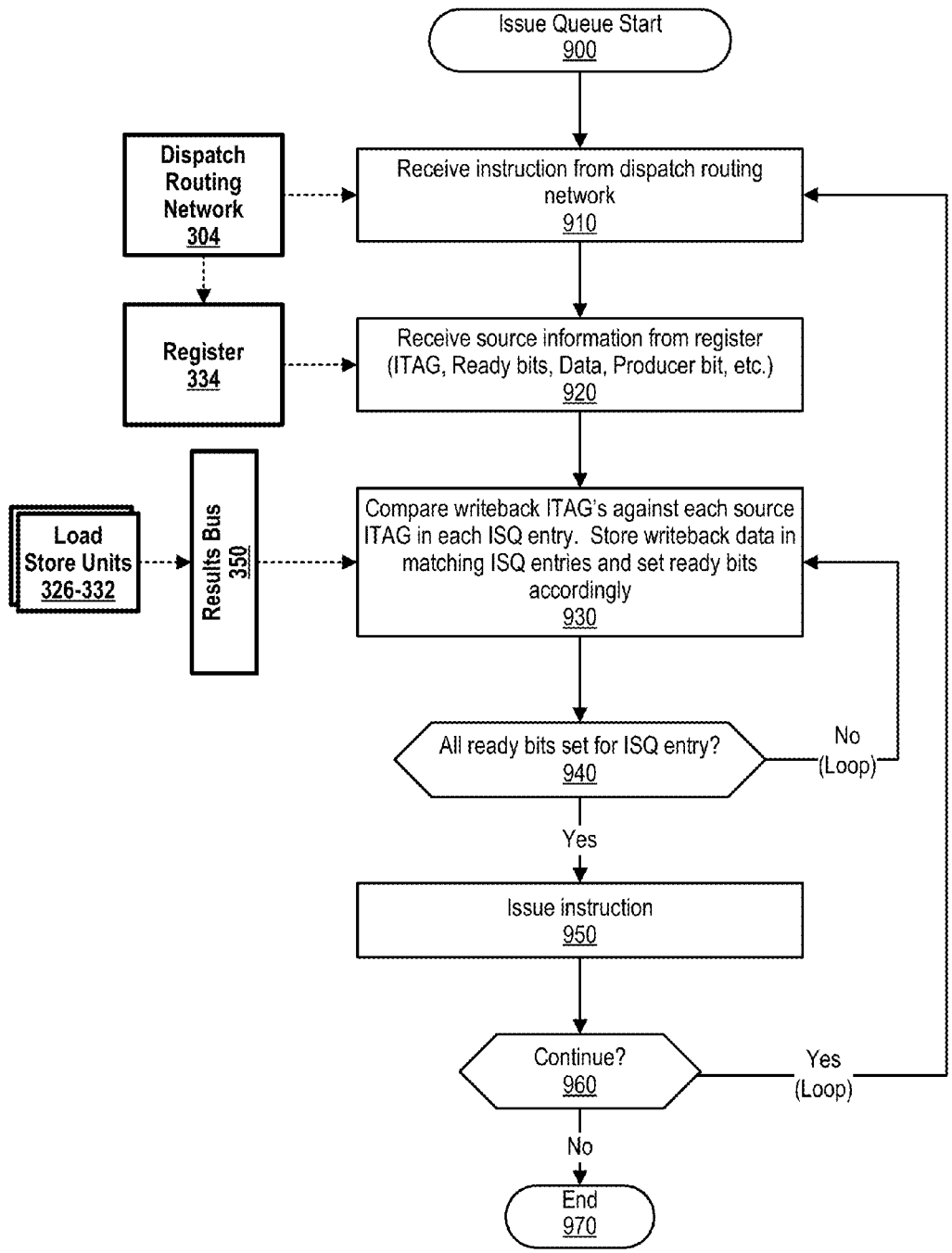
FIG. 9 is an exemplary flowchart depicting steps taken by a computing system to receive dispatch information and writeback data at an issue queue and update ready bits accordingly.

The register, issue queue, and history buffer are each responsible for updating their own copy of the ready bits in their respective entries when one or more of the load store units or VSU perform writeback functions for the specific ITAG on results bus 350 (see FIGS. 7-9 and corresponding text for further details). Because the register, issue queue, and history buffer all use a similar ready bit update scheme, a register is not required to communicate with the issue queues after an initial dispatch lookup when data was written for a source because the issue queue tracks the source ITAG and ready bits itself via results bus 350 to capture the writebacks when they occur and updates its own ready bits accordingly.

An entry ITAG (ITAG within a specific entry) corresponding to a writeback may be in the register, history buffer, and/or issue queue depending on when the writeback occurs relative to instruction dispatch. The writeback may occur while the target is still in the register and before it is read as a source at dispatch. In this situation, the issue queue receives non-zero ready bits at dispatch. The writeback may also occur while the target is still in the register and before a new target is dispatched to that same register. In this situation, the history buffer receives the non-zero ready bits.

The writeback may occur after the instruction has been read out of the register as a source and is sitting in the issue queue. In this situation, the issue queue receives zero value ready bits at dispatch and updates the ready bits as writebacks occur. The writeback may also occur after the instruction is read out of the register as an old target and is sitting in the history buffer. In this situation, the history buffer receives zero value ready bits at dispatch and updates the ready bits as writebacks occur.

Figure 4:
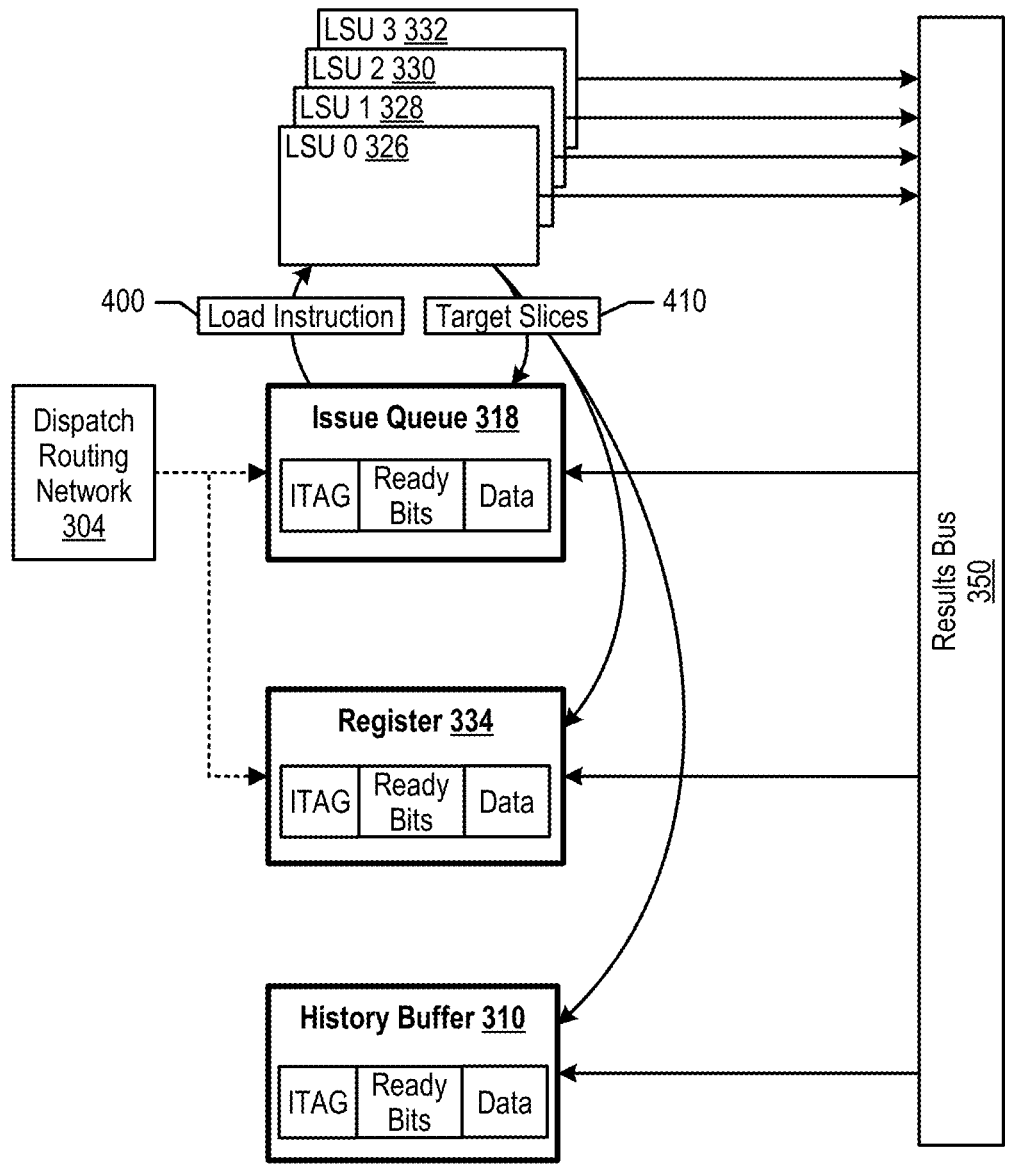
FIG. 4 is an exemplary diagram depicting an issue queue, register, and history buffer independently updating ready bits in their corresponding entries.

FIG. 4 is an exemplary diagram depicting an issue queue, register, and history buffer independently updating ready bits in their corresponding entries. Dispatch routing network 304 dispatches an instruction to issue queue 318 and register 334. Issue queue 318 identifies which load store unit will process the instruction and issues load instruction 400 to the identified load store units.

In one embodiment, issue queue 318 includes logic to identify the load store units to process the instruction. In this embodiment, when issue queue 318 issues load instruction 318, the logic determines which load store units will return the load result data and generates "target slices." The target slices include a bit that is set for each load store unit that will provide writeback data. For example, if load store unit 0 is providing writeback data, target slices 410 may be "1000." The load store units send target slices 410 to issue queue 318, register 334, and history buffer 310. As such, each of issue queue 318, register 334, and history buffer 310 preset ready bits corresponding to load store units not providing writeback data. Continuing with the example above, issue queue 318, register 334, and history buffer 310 set a matching entry ITAG's ready bits to "X111" such that when load store unit 0 provides the writeback data, each of the ready bits will be set to 1 and the instruction is ready for issue (see FIG. 6 and corresponding text for further details).

FIG. 5 is an exemplary diagram depicting a group of ready bits that are stored and tracked by the registers, issue queues, and history buffers for each entry. Each ready bit corresponds to a load store unit and indicates whether the load store unit has provided their portion of the writeback data. When an instruction dispatches, the registers, issue queue, and history buffer receive target slice information from a load store unit on writeback as discussed earlier. The target slice information indicates which load store unit will provide writeback data for a particular ITAG.

Figure 6:
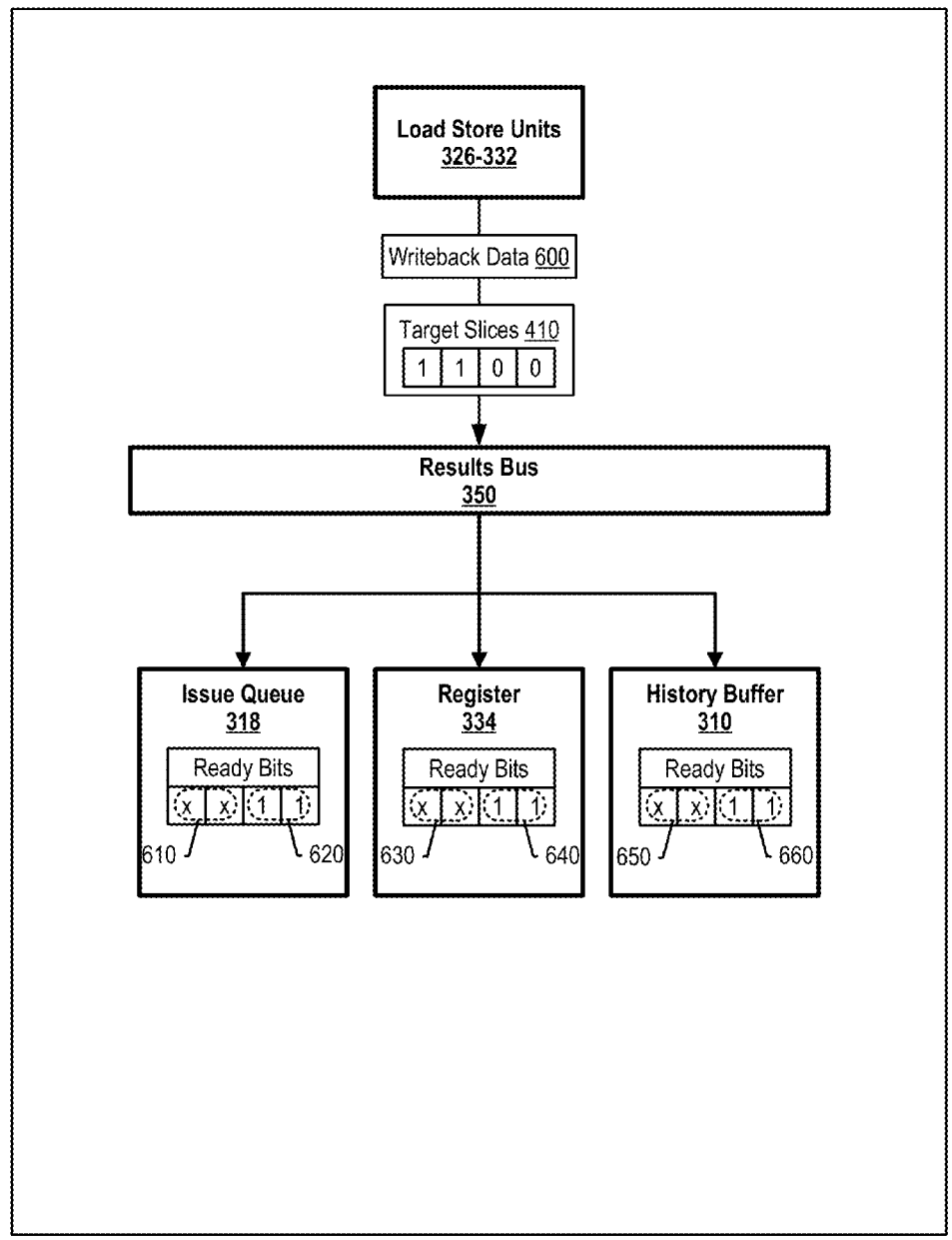
FIG. 6 is an exemplary timing diagram depicting load store units providing target slice information and the issue queue, register, and history buffer setting ready bits in their respective matching entries.

For example, when load store units 0 and 1 are going to be providing the writeback data, the target slice information is "1100" (see FIG. 6 and corresponding text for further details). As such, ready bits 530 and 540 are preset to "1" because load store units 2 and 3 are not providing writeback data, resulting in "XX11." In turn, as load store units 0 and 1 provide writeback data, ready bits 510 and 520 are set, respectively. As a result, the issue queue determines when the writeback data is completely available for an instruction when each of the ready bits are set to 1 (see FIG. 9 and corresponding text for further details). As discussed earlier, when a VSU provides writeback data in its entirety, each of ready bits 510, 520, 530, and 540 are set, indicating that the writeback data is available.

FIG. 6 is an exemplary timing diagram depicting load store units providing target slice information and the issue queue, register, and history buffer setting ready bits in their respective matching entries. While FIG. 5 shows the reasoning behind using a different ready bit to represent each load store unit, FIG. 6 shows how issue queue 318, register 334, and history buffer 310 utilize target slice information to initially set the ready bits.

One of load store units 326-332 provides target slices 410 to issue queue 318, register 334, and history buffer 310 over results bus 350. Target slices 410 indicates that load store units 0 and 1 will be providing the writeback data. As such, assuming that each of issue queue 318, register 334, and history buffer 310 have a matching entry, issue queue 318 presets ready bits 620, register 334 presets ready bits 640, and history buffer 310 presets ready bits 660 for the matched entry because load store units 2 and 3 will not be providing writeback data.

In turn, when load store unit 0 or 1 send writeback data 600 on results bus 350, issue queue 318, register 334, and history buffer 310 each set their own ready bits accordingly (see FIGS. 7, 8, 9, and corresponding text for further details). When each of the ready bits are set, issue queue 318 knows that the instruction is ready to issue.

FIG. 7 is an exemplary flowchart depicting steps taken by a computing system to receive writeback data from load/store units at a register and update ready bits accordingly. FIG. 7 processing commences at 700 whereupon, at step 710, the process receives target slice information, a writeback ITAG, and data from one or more of load/store units 326-332 over results bus 350. At step 720, the process retrieves an entry ITAG from target/source register entry (e.g., in register 334) that corresponds to the writeback information.

At step 730, the process compares the retrieved entry ITAG with the writeback ITAG and determines whether the retrieved entry ITAG matches the writeback ITAG (decision 740). If the retrieved entry ITAG matches the writeback ITAG, then decision 740 branches to the 'yes' branch.

At step 750, the process stores the writeback data in the corresponding register entry and, at step 760, the process updates a ready bit corresponding to the load store unit that provided the data in the register entry. For example, if "load store unit 1" provided the writeback data, the process sets the ready bit that corresponds to load store unit 1. Referring back to decision 740, if the retrieved entry ITAG does not match the writeback ITAG, decision 740 branches to the "No" branch and bypasses steps 750-760. FIG. 7 processing thereafter ends at 770.

FIG. 8 is an exemplary flowchart depicting steps taken by a computing system to receive writeback data from load store units at a history buffer and update ready bits accordingly. FIG. 8 processing commences at 800 whereupon, at step 810, the process receives target slice information, a writeback ITAG, and data from one or more of load/store units 326-332 over results bus 350. At step 820, the process selects a first history buffer entry and extracts an entry ITAG form the selected history buffer entry. In one embodiment, the process evaluates each history buffer entry to determine whether a match exists between the writeback ITAG and the entry ITAG values (e.g., blast approach).

At step 830, the process compares the extracted entry ITAG with the writeback ITAG and determines whether the entry ITAG matches the writeback ITAG (decision 840). If the entry ITAG matches the writeback ITAG, then decision 840 branches to the 'yes' branch.

At step 850, the process stores the writeback data in the corresponding history buffer entry and, at step 860, the process updates a ready bit corresponding to the load store unit that provided the data in the history buffer entry. For example, if "load store unit 2" provided the writeback data, the process sets the ready bit that corresponds to load store unit 2. Referring back to decision 840, if the entry ITAG does not match the writeback ITAG, decision 740 branches to the "No" branch and bypasses steps 850-860.

The process determines whether the history buffer has more history buffer entries to evaluate (decision 870). If there are more entries to evaluate, decision 870 branches to the "Yes" branch, which loops back to select and process the next history buffer entry. This looping continues until there are no more history buffer entries to evaluate, at which point decision 870 branches to the "No" branch, and FIG. 8 processing thereafter ends at 880.

FIG. 9 is an exemplary flowchart depicting steps taken by a computing system to receive dispatch information and writeback data at an issue queue and update ready bits accordingly. FIG. 9 processing commences at 900 whereupon, at step 910, the process receives an instruction from dispatch routing network 304. In one embodiment, dispatch routing network 304 also sends the instruction to register 334 (or other register within computing system 300).

At step 920, the process receives source information from register 334, such as an ITAG, ready bits, data, producer bit, etc.). At step 930, the process receives writeback data form load/store units 326-332 over results bus 350 and compares the writeback ITAG's against each source's entry ITAG in each issue queue entry. For each matching source ITAG, the process stores writeback data in the matching issue queue entries and sets their ready bits accordingly.

The process determines whether each ready bit is set for an issue queue entry (e.g., "1111", decision 940). If no issue queue entry has each ready bit set, then decision 940 branches to the "No" branch, which loops back to monitor writeback data on results bus 350 and update ready bits accordingly. This looping continues until an issue queue entry has each ready bit set, at which point decision 940 branches to the "Yes" branch.

At step 950, the process issues the instruction that has each ready bit set. At step 960, the process determines whether to continue (decision 960). If the process should continue, decision 960 branches to the "Yes" branch, which loops back to receive another instruction from dispatch routing network 304. This looping continues until the process should terminate, at which point decision 960 branches to the "No" branch, whereupon FIG. 9 processing thereafter ends at 970.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors; and
   a set of computer program instructions stored in the memory and executed by at least one of the processors in order to perform actions of:
      matching a first writeback instruction tag (ITAG) to an entry instruction tag (ITAG) included in a matched one of a plurality of entries, wherein the first writeback ITAG is provided by a first one of a plurality of load store units, and wherein the entry ITAG corresponds to an instruction;
      setting, in the matched entry, a first one of a plurality of ready bits that correspond to the first load store unit, wherein each of the plurality of ready bits correspond to one of the plurality of load store units; and
      issuing the instruction based upon detecting that each of the plurality of ready bits is set.

2. The information handling system of claim 1 wherein the one or more processors perform additional actions comprising:
   matching a second writeback ITAG to the entry ITAG, wherein the second writeback ITAG is provided by a second one of the plurality of load store units, the second writeback ITAG matching the first writeback ITAG; and
   setting, in the matched entry, a second one of the plurality of ready bits that correspond to the second load store unit, wherein the setting of the second ready bit results in each of the plurality of ready bits being set.

3. The information handling system of claim 1 wherein the one or more processors perform additional actions comprising:
   generating target slice information that identifies one or more of the plurality of load store unit that are not providing writeback data corresponding to the instruction; and
   presetting one or more of the plurality of ready bits that correspond to the one or more load store units not providing the writeback data.

4. The information handling system of claim 1 wherein the entry ITAG is a register entry instruction tag (ITAG) stored in a selected one of a plurality of register entries, and wherein the one or more processors perform additional actions comprising:
   in response to matching the writeback ITAG with the register entry ITAG, storing writeback data corresponding to the writeback ITAG in the selected register entry; and
   setting the first ready bit in the selected register entry.

5. The information handling system of claim 4 wherein the one or more processors perform additional actions comprising:
   comparing the writeback ITAG with each of a plurality of issue queue entry instruction tags (ITAGs) included in a plurality of issue queue entries;
   detecting that at least a selected one of the plurality of issue queue entries includes a selected one of the plurality of issue queue entry ITAGs that match the writeback ITAG; and
   setting a different first ready bit in the selected issue queue entry, the different first ready bit corresponding to the first load store unit.

6. The information handling system of claim 1 wherein the one or more processors perform additional actions comprising:
   comparing the writeback ITAG with each of a plurality of history buffer entry instruction tags (ITAGs) included in a plurality of history buffer entries;
   detecting that at least a selected one of the plurality of history buffer entries includes a selected one of the plurality of history buffer entry ITAGs that match the writeback ITAG; and
   setting a different first ready bit in the selected history buffer entry, the different first ready bit corresponding to the first load store unit.

7. The information handling system of claim 1 further comprising:
   a plurality of slices, each one of the plurality of slices comprising one of a plurality of history buffers, one of a plurality of issue queues, and one of the plurality of load store units; and
   one or more super slices that each include the plurality of slices and one of the plurality of registers, wherein the first writeback ITAG is sent from one of the plurality of load store units residing on a first one of the one or more super slices to at least one of the plurality of registers that reside on a second one of the one or more super slices.

8. A computer program product stored in a computer readable storage medium, comprising computer program code that, when executed by an information handling system, causes the information handling system to perform actions comprising:
   matching a first writeback instruction tag (ITAG) to an entry instruction tag (ITAG) included in a matched one of a plurality of entries, wherein the first writeback ITAG is provided by a first one of a plurality of load store units, and wherein the entry ITAG corresponds to an instruction;
   setting, in the matched entry, a first one of a plurality of ready bits that correspond to the first load store unit, wherein each of the plurality of ready bits correspond to one of the plurality of load store units; and
   issuing the instruction based upon detecting that each of the plurality of ready bits is set.

9. The computer program product of claim 8 wherein the information handling system performs additional actions comprising:
   matching a second writeback ITAG to the entry ITAG, wherein the second writeback ITAG is provided by a second one of the plurality of load store units, the second writeback ITAG matching the first writeback ITAG; and
   setting, in the matched entry, a second one of the plurality of ready bits that correspond to the second load store unit, wherein the setting of the second ready bit results in each of the plurality of ready bits being set.

10. The computer program product of claim 8 wherein the information handling system performs additional actions comprising:

generating target slice information that identifies one or more of the plurality of load store unit that are not providing writeback data corresponding to the instruction; and presetting one or more of the plurality of ready bits that correspond to the one or more load store units not providing the writeback data.

11. The computer program product of claim 8 wherein the entry ITAG is a register entry instruction tag (ITAG) stored in a selected one of a plurality of register entries, and wherein the information handling system performs additional actions comprising:

in response to matching the writeback ITAG with the register entry ITAG, storing writeback data corresponding to the writeback ITAG in the selected register entry; and setting the first ready bit in the selected register entry.

12. The computer program product of claim 11 wherein the information handling system performs additional actions comprising:

comparing the writeback ITAG with each of a plurality of issue queue entry instruction tags (ITAGs) included in a plurality of issue queue entries;

detecting that at least a selected one of the plurality of issue queue entries includes a selected one of the plurality of issue queue entry ITAGs that match the writeback ITAG; and setting a different first ready bit in the selected issue queue entry, the different first ready bit corresponding to the first load store unit.

13. The computer program product of claim 8 wherein the information handling system performs additional actions comprising:

comparing the writeback ITAG with each of a plurality of history buffer entry instruction tags (ITAGs) included in a plurality of history buffer entries;

detecting that at least a selected one of the plurality of history buffer entries includes a selected one of the plurality of history buffer entry ITAGs that match the writeback ITAG; and setting a different first ready bit in the selected history buffer entry, the different first ready bit corresponding to the first load store unit.

\* \* \* \* \*